Dec. 2, 1969     J. A. ROSSI     3,481,169
RELEASABLE CARRYING MEANS FOR A KEY
Filed Jan. 17, 1968     2 Sheets-Sheet 1
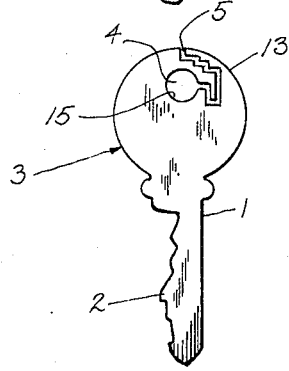
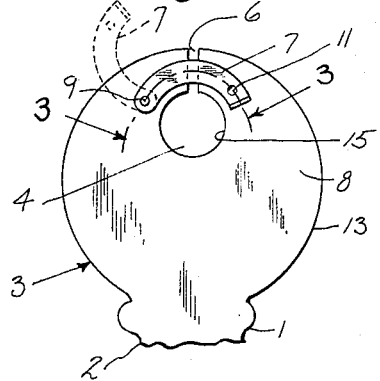
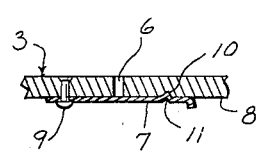
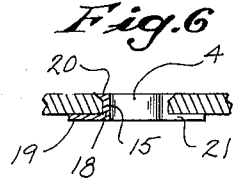
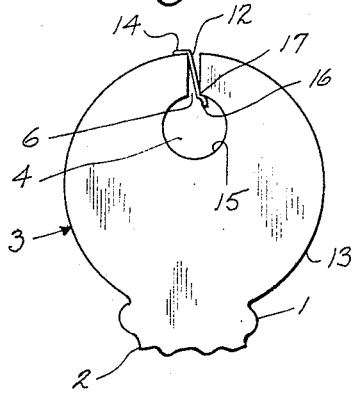
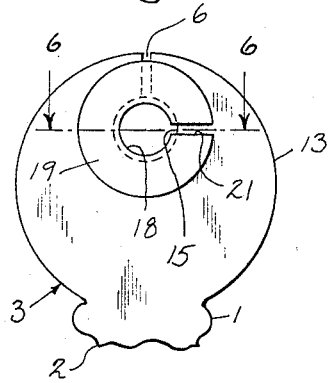
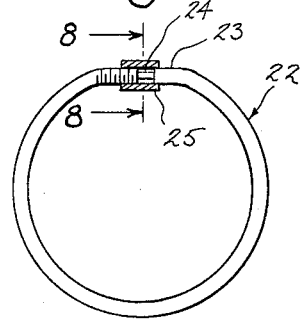
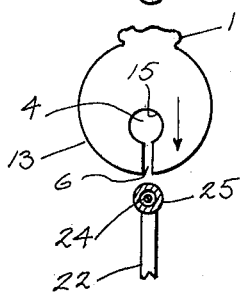
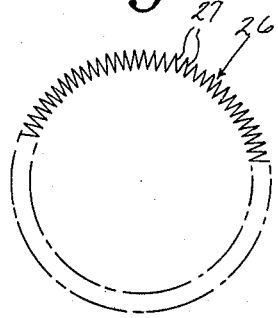
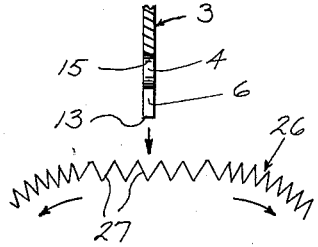
INVENTOR
JORGE A. ROSSI
ATTORNEY

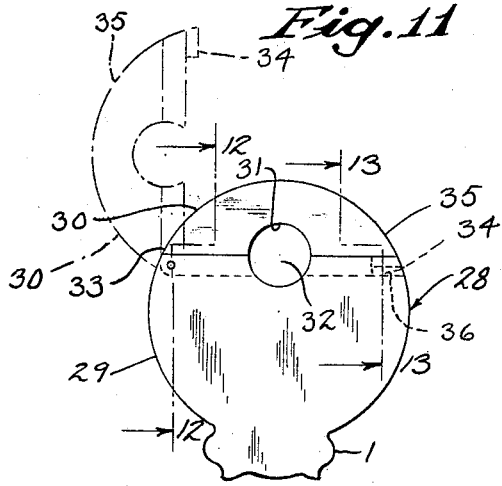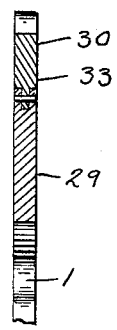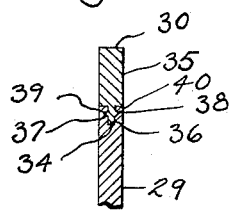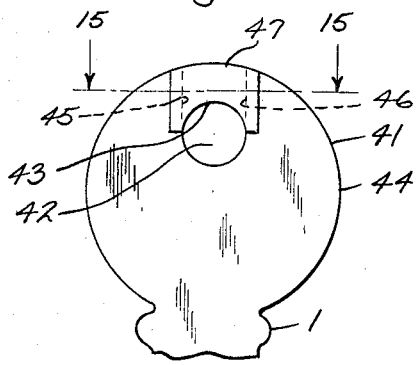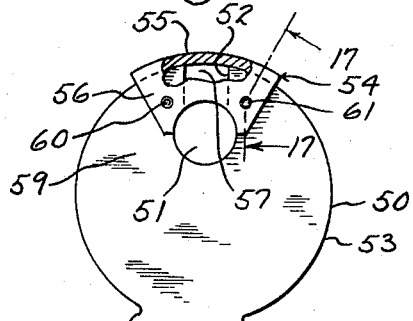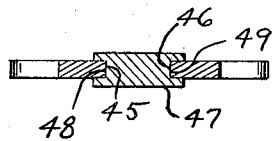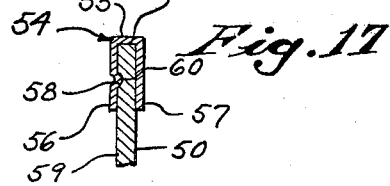

United States Patent Office 3,481,169
Patented Dec. 2, 1969

3,481,169
RELEASABLE CARRYING MEANS FOR A KEY
Jorge A. Rossi, 1260 N. Prospect,
Milwaukee, Wis. 53202
Filed Jan. 17, 1968, Ser. No. 698,460
Int. Cl. A44b 15/00; E05b 19/04
U.S. Cl. 70—408                                    3 Claims

ABSTRACT OF THE DISCLOSURE

The bow of a key for a cylinder lock includes a hole for mounting the key on a key ring and a channel cut through the bow to the hole to provide an access to the hole. In one embodiment, the channel is made narrower than the hole and means are provided for varying the diameter of the key ring. In another embodiment the channel is given a labyrinthine shape. Latches are also shown for closing the channel. In one embodiment the bow is made in two sections hinged together to close about the key ring.

BACKGROUND OF THE INVENTION

Traditionally, keys of all sorts have been made with a shank which supports a bit for operating the lock and which has a bow on one end for manipulating the key. Traditionally, also, the bow has had a hole in it, or has been formed in a loop to receive a key ring for carrying it and storing it. A wide variety of different types of key rings have been devised over the years to permit the keys to be easily mounted on them and at the same time to provide a secure carrying means for keys. Such key rings have taken the form of annular metal rings, chains, hooks, leather carrying cases with releasable hooks, and the like.

In recent times, the need for some means for more easily releasing individual keys from key rings has developed and the various types of key rings available have proved too cumbersome. When drivers leave their automobiles with parking lot attendants and maintenance persons, it is often necessary to leave the ignition key, but usually it is not convenient or desirable to leave the trunk key, house keys, office keys and others also. Sometimes occasions arise when it is necessary to leave house keys, or office keys, or desk keys with service personnel or employees, but when it is not convenient to relinquish all of one's keys also. For each occasion there is need to be able to remove a key from its key ring and replace it with minimum effort and time. Nevertheless, at all other times the key must remain securely attached to the key ring to avoid loss. The prior art is not adequate to these demands.

SUMMARY OF THE INVENTION

The present invention relates to a releasable carrying means for a key and more specifically it resides in the combination of a key having a bow on one end of its shank with a hole through it for receiving a key ring, and having the bow so formed so as to provide easy access to the hole for mounting the key on a key ring and removing the key from the key ring.

The present invention makes possible a releasable carrying means on the key itself so that the key may be used with any type of key ring and can be readily removed or mounted on the key ring. Nevertheless, the key is securely held on the key ring at all other times, and will not come off the key ring except when desired. The structure of the present invention is such that these advantages may be enjoyed at negligible, if any cost, since in its simplest form the present invention may be accomplished with no more than a simple change in the shape of the dies user in making the key blanks. The present invention not only satisfies the need for a key that may be readily released from and replaced onto the key ring, but it does so in a manner such that it is economically feasible to market the invention embodied in all types of keys.

BRIEF DESCRIPTION OF THE DRAWINGS

FIG. 1 shows a cylinder key embodying the present invention with a labyrinthine channel communicating through the bow to the key ring hole in the bow.

FIG. 2 illustrates a second embodiment of the present invention utilizing a hinged latch.

FIG. 3 is a cross sectional view of the embodiment shown in FIG. 2 taken along the arcuate line 3—3 in FIG. 2.

FIG. 4 illustrates a third embodiment of the present invention employing a spring latch across the channel communicating with the key ring hole in the bow.

FIG. 5 illustrates a fourth embodiment of the present invention using an annular sliding sleeve for a latching means for closing the channel communicating with the key ring hole in the bow.

FIG. 6 is a sectional view of the embodiment shown in FIG. 5 taken along the line 6—6 in FIG. 5.

FIG. 7 illustrates a key ring having a narrow portion covered by an internally threaded coupler for use with a key embodying the present invention.

FIG. 8 illustrates a key ring shown in FIG. 7 taken in section along the line 8—8 in FIG. 7 along with a key embodying the present invention.

FIG. 9 illustrates a second form of key ring for use with a key embodying the present invention.

FIG. 10 illustrates the key ring shown in FIG. 9 and expanded for removal from or mounting on of the key such as the key shown in FIG. 8 which is illustrated in section in FIG. 10.

FIG. 11 illustrates another embodiment of the present invention wherein the bow of the key is formed in two sections that are hinged together to provide access to the key ring hole.

FIG. 12 is a view in section of the embodiment shown in FIG. 11 taken along the line 12—12 in FIG. 11.

FIG. 13 is a view in section of the embodiment shown in FIG. 11 taken along the line 13—13 in FIG. 11.

FIG. 14 illustrates another embodiment of the present invention having a sliding plug latch means.

FIG. 15 is a view partially in section of the embodiment shown in FIG. 14 taken along the line 15—15 in FIG. 14.

FIG. 16 is another embodiment of the present invention employing a cap latch to close the channel to the key ring hole.

FIG. 17 is a view in section of the embodiment shown in FIG. 16 taken along the line 17—17 in FIG. 16.

DESCRIPTION OF THE PREFERRED EMBODIMENTS

FIG. 1 is a key for a cylinder lock and it is of conventional construction except for its embodying the present invention. The key is made up of a shank 1 that supports and forms a part of a bit 2, which is shaped to actuate the tumblers of a lock to permit the lock to be opened and closed. On one end of the shank 1 is a bow 3 that serves as a handle, by which the key is both operated and carried. The bow 3 has a key ring hole 4 through it to receive a key ring, which may be a solid annulus, or chain, or some form of clip by which the key is carried or stored, when not in use. (Except when specifically defined otherwise, the term "key ring" as used in this specification includes the conventional annular ring, a chain, a hook or any other device used to carry and store keys. It may also be noted that the invention is not limited to cylinder-type locks.) The key ring hole 4 may be a relatively small hole in a large bow as in the embodiment shown, but it may also be the center of an annular ring, such as is commonly seen on older type door locks. The shape, configuration and type of bit is, of course, of no consequence to the present invention.

A channel 5 communicates from the key ring hole 4 through an outer periphery 13 of the bow 3, and in the first embodiment it is relatively narrow and has a labyrinthine configuration. This labyrinthine channel 5 allows a key ring to be worked through it into the key ring hole 4 for mounting the key on the key ring, or back through the channel 5 for removing the key from the key ring, although it will securely hold the key on the ring at all other times. This embodiment of the invention has a couple of unique advantages. First of all, it may be manufactured by making a relatively minor change in the die used to stamp out the key blank, and hence it adds virtually nothing to the manufacturing cost of the key and may even effect a material saving. Secondly, since it has no moving parts there is nothing that can malfunction or wear out.

The second embodiment is shown in FIG. 2 where only the bow 3 and the very top end of the shank 1 is shown. The second embodiment has a straight channel 6 extending from the top of the key ring 4 through the top periphery 13 of the bow 3. An arcuate latch 7 is hinge-mounted to one lateral surface 8 of the bow 3 on a pin 9 which extends through the bow 3 and is pivoted in position. On the opposite side of the channel 6 from the pin 9, a detent 10 is stamped in the lateral surface 8 of the bow 3, and a projection 11 is stamped in the latch 7 to mate with the detent 10 and clasp the latch 7 in its closed position. The latch 7 is made from a strip of resilient steel and mounted to hug the lateral surface 8 of the bow 3 closely so as to press the projection 11 securely in the detent 10. To remove the key from the key ring, the free end of the latch 7 is pulled away from the lateral surface 8 of the bow 3 sufficiently to release the projection 11 from the detent 10, so that the latch 7 may be pivoted about its hinge mounting on the pin 9 away from the channel 6 and into the dotted position shown in FIG. 2. With the channel 6 thus opened, the key ring has easy access through the channel 6. This embodiment requires a minimum of additional material and fabrication and at the same time it is rugged and simple to operate in the dark or light.

A third embodiment is shown in FIG. 4, and it has the same type of channel 6 as was used in the second embodiment. The difference lies in the latching means employed. In the third embodiment, a resilient spring latch 12 is a fixed leaf spring with one end 14 mounted on the outside periphery 13 of the bow 3 at one side of the channel 6. The spring latch 12 is bent downward from its secured end 14, and it extends diagonally across the channel 6 to about the edge of the channel 6 adjacent to the inside surface 15 of the key ring hole 4, with its free end 16 projecting into the key ring hole 4. The free end 16 of the spring latch 12 has an off-set bent in it to present a shoulder 17 which bears against the inside surface 15 of the key ring hole 4 so as to secure the spring latch 12 in position. To mount the key on a key ring, the key ring is simply forced through the channel 6 pushing the spring latch 12 to one side as it enters the key ring hole 4. To remove the key from the key ring hole, the free end 16 of the spring latch 12 can be hooked with a fingernail and pulled aside to allow the key ring to pass through the channel 6.

The fourth embodiment is illustrated in FIGS. 5 and 6 where again all that is shown of the key is the bow 3 and the very top end of the shank 1. Again there is a key ring hole 4 with a straight channel 6 extending from the top of the hole 4 through the top periphery 13 of the bow 3. Rotatably mounted inside of the key ring hole 4 is a sleeve 18 which has a large flange 19 extending radially from one end adjacent to the lateral surface 8 of the bow 3, and a smaller flange 20 radiates from the opposite end of the sleeve 18 to fill a beveled edge of the surface 15 of the key ring hole 4 to hold the sleeve 18 in position. A straight slot 21 corresponding in size to the channel 6 is cut through the entire sleeve 18 including both flanges 19 and 20, but the dimensions of the slots 21 have no specific maximum so that any gap in the sleeve 18 will do, provided it is big enough. In the position shown in FIG. 5, the sleeve 18 latching means closes the channel 6, but by rotating the sleeves 18 from the position shown in the drawing about 90° in a counter clockwise direction, the slot 21 would be aligned with the channel 6 to open the channel 6 so that a key ring could be inserted into or taken out of the key ring hole 4. Although in the embodiment shown the sleeve 18 extends almost a full 360° to line most of the inside surface 15 of the key ring hole 4, it will be readily apparent upon reflection that a segment of much shorter circular length would also serve.

The embodiments of the FIGS. 7, 8, 9 and 10 require cooperating structures in the key ring as well as the key. FIG. 7 shows one form of the key ring 22 that is usable with the present invention. It is a substantially annular metal ring, a portion of which is flattened into a cord 23, and a reduced diameter, constricted portion 24 is formed near the center of the cord 23, or flattened portion of the ring 22, to present a reduced transverse dimension that is smaller than the width of the channel 6. The cord 23 is externally threaded. An internally threaded coupler 25 is thread mounted about the cord 23 so that by turning the coupler 25 it becomes axially movable either over the reduced diameter segment 24 or away from the reduced diameter segment 24.

The key to be used with the key ring 22 as shown in FIG. 7 may be the same as that illustrated in FIGS. 2–5 except that it has no latching means. The coupler 25 is turned away from the reduced diameter segment 24 to allow the reduced diameter segment 24 to pass through the channel 6 into the key ring hole 4, and then the coupler 25 may be turned back across the reduced diameter segment 24 to hold the key on the ring. Of course, the key is removed in the same manner.

FIG. 9 illustrates yet another form of key ring 26 capable of exposing a reduced transverse dimension to pass through the channel 6 into and out of the key ring hole 4. In this embodiment the key ring 26 may be attenuated by stretching it. The key ring shown 26 in FIGS. 9 and 10 is a ring of helically coiled resilient material such as wire or plastic strands 27. Normally, the coiled strand 27 is compressed to present a large diameter that is greater than the width of the relatively narrow channel 6. However, by stretching the coil, or helix, extended portions of the thin strand 27 may be exposed to pass through the slot 6 into and out of the key ring hole 4.

In the embodiment of FIGS. 11, 12 and 13 a bow 28 is formed in lower and upper segments 29 and 30. The lower bow segment 29 has the shank 1 and bit 2 projecting from it and defining half of an inside surface 31 of a key ring hole 23. The upper bow segment 30 is hinge-mounted at one end 33 to the mating end of the lower bow segment 29, and the upper bow segment 30 defines the other half of the inside surface 31 of the key ring hole 32 so that it will register with the lower half of the surface 31 defined by the lower bow segment 29. The upper bow segment 30 has a tongue 34 projecting from its free end 35 to fit in a groove 36 formed in the lower bow segment 29. The groove 36 has detents 37 and 38 formed on the inside surfaces to be engaged by projections 39 and 40 on the tongue 34 and thus provide a clasping means to hold the upper bow segment 30 normally securely on the top of the lower bow segment 29. To mount or release a key of this embodiment on a key ring, the tongue 34 on the upper bow segment 30 is pulled out of the groove 36 in the lower bow segment 29 and the upper bow segment 30 is hinged away from the lower bow segment 29 opening up the key ring hole 32.

Still another embodiment of the invention is illustrated in FIGS. 14 and 15 where a bow 41 of a key has a key ring hole 42 and a channel 43 communicating from the key ring hole 42 through the outside periphery 44 of the bow 41. In this embodiment, the sides 46 and 47 of the channel 43 are tangent to the key ring hole 42 so that the channel 43 is as wide as the diameter of the round key ring hole 42. A sliding plug 47, having guide ways 48 and 49 formed in its opposite sides to receive the sides 45 and 46, respectively, of the channel 43, slides into the channel 43 and defines the top surface of the key hole 42. By forming the plug 47 of a resilient material in press fit dimensions with respect to the channel 43, the guide ways 48 and 49 of the plug 47 will grip the sides 45 and 46 of the channel 43 to hold the plug 47 firmly in place, until it is forceably removed to release the key from the key ring or to mount the key onto the key ring. Alternatively, other types of clasping, of course, can be used, such as the detent and projection devices shown in the other embodiments.

The last embodiment is illustrated in FIGS. 16 and 17, and it has a bow 50 with a key ring hole 51 through it and a wide, straight channel 52 communicating between the key ring hole 51 through the outer periphery 53 of the bow 50. As a latching means, a cap 54 is formed to slide over the top portion of the bow 50 and it also defines the top portion of the key ring hole 51. The cap 54 is stamped from sheet material to have a top wall 55 and two downwardly projecting side walls 56 and 57 that are biased inwardly to grasp the bow 50 between them. A pair of detents 58 are stamped in a lateral surface 59 of the bow 50 on opposite sides of the channel 52 and projections 60 and 61 are stamped in the side wall 56 of the cap 54 adjacent to the lateral surface 59 to engage the detents 58 and form a clasping means therewith to hold the cap 54 securely onto the bow 50. To remove the key from, or replace the key onto a key ring, it is only necessary to spread the side walls 56 and 57 of the cap 54 slightly to release the projections 60 and 61 from the detents 58 and remove the cap 54 from the bow 50. Thus access can be had to or from the key ring hole 51.

From the foregoing embodiments of the present invention it should be abundantly clear to those skilled in the art how the invention may be made and used. Essentially it involves the formation of structure on the key itself to cooperate with the key ring so that the key may be readily mounted and removed from the key ring. In those embodiments employing a latching means, some form of clasping device is recommended to hold the latch securely in the closed position, except, of course, when it is desired to remove or replace the key on the key ring. Perhaps the simplest and cheapest type of clasping means is the detent and projection device shown in several of the embodiments, although in some cases a snug fit will be sufficient.

What is claimed is:
1. A releasable carrying means for a key comprising the combination of
   a key having a shank for a bit for operating a lock, and having a bow for handling said key on one end of said shank;
   a hole through said bow to receive a key ring;
   a channel cut through said bow communicating between a periphery of said bow and said hole;
   said channel having a minimum width substantially less than a transverse dimension of said hole;
   a key ring through said hole in said bow having a constricted segment of smaller transverse dimension than said channel, and elsewhere having a transverse dimension larger than the width of said channel;
   and an axially movable coupler mounted around said ring to normally bridge said constricted segment and to be movable away from said segment when said key is to be removed.

2. A releasable carrying means for a key as set forth in claim 1 wherein
   said key ring is threaded adjacent to said constricted segment;
   and said axially movable sleeve is interiorly threaded to engage said threaded ring to be moved by turning said axially movable sleeve about said ring.

3. A releasable carrying means for a key comprising the combination of
   a key having a shank for a bit for operating a lock, and having a bow for handling said key on one end of said shank;
   a hole through said bow to receive a key ring;
   a channel cut through said bow communicating between a periphery of said bow and said hole;
   said channel having a minimum width substantially less than a transverse dimension of said hole;
   a key ring through said hole in said bow normally having transverse dimensions to great to pass through said channel;
   and said key ring being resiliently axially extendable and when extended presenting an attenuated transverse dimension small enough to pass through said channel.

References Cited
UNITED STATES PATENTS

| 505,882 | 10/1893 | Mauch | 70—459 |
| 691,433 | 1/1902 | Baker | 59—85 |
| 3,315,504 | 4/1967 | Billings | 70—408 |

FOREIGN PATENTS 488,575 12/1953 Italy.

MARVIN A. CHAMPION, Primary Examiner

ROBERT L. WOLFE, Assistant Examiner

U.S. Cl. X.R.

70—457, 456